United States Patent [19]

Saruhashi et al.

[11] Patent Number: 4,679,382
[45] Date of Patent: Jul. 14, 1987

[54] RIDING TYPE MOWER

[75] Inventors: Kazuo Saruhashi, Saitama; Masato Ara, Chiba; Takanori Suzuki, Saitama; Gunji Saito, Saitama; Atsushi Kojima, Saitama, all of Japan

[73] Assignee: Honda Giken Kogyo Kabushiki Kaisha, Tokyo, Japan

[21] Appl. No.: 769,117

[22] Filed: Aug. 26, 1985

[30] Foreign Application Priority Data

Aug. 27, 1984 [JP] Japan ................. 59-179135
Aug. 27, 1984 [JP] Japan ................. 59-179136
Aug. 27, 1984 [JP] Japan ................. 59-179137
Jan. 22, 1985 [JP] Japan ................. 60-9544

[51] Int. Cl.$^4$ ............... A01D 55/18; A01D 35/24
[52] U.S. Cl. ..................... 56/10.1; 56/10.8; 56/15.2; 56/DIG. 22; 56/14.7; 180/900
[58] Field of Search ........... 56/16.7, 16.9, 12.2, 56/14.7, 10.5, 15.8, DIG. 22, 10.4, 11.1, 11.2, 11.4, 15.4, 11.08

[56] References Cited

U.S. PATENT DOCUMENTS

| | | | |
|---|---|---|---|
| 3,038,288 | 6/1962 | Peptula et al. | 56/11.1 |
| 3,169,358 | 2/1965 | Ertsgaard et al. | 1.56/10.5 |
| 3,466,855 | 9/1969 | Hanson et al. | 56/DIG. 22 |
| 3,512,344 | 5/1970 | Kortun | 56/DIG. 22 |
| 3,672,137 | 6/1972 | Hamouz et al. | 56/15.8 |
| 3,686,840 | 8/1972 | Root | 56/DIG. 22 |
| 3,795,094 | 3/1974 | Mollen et al. | 56/11.1 |
| 4,263,977 | 4/1981 | Willett | 56/DIG. 22 |

Primary Examiner—Robert Peshock
Assistant Examiner—John G. Weiss
Attorney, Agent, or Firm—Armstrong, Nikaido, Marmelstein & Kubovcik

[57] ABSTRACT

A riding type mower includes steered front wheels and driven rear wheels arranged in the front and rear parts of a vehicle body, respectively, a mowing cutter mechanism disposed under the vehicle body, a driver's seat disposed on the vehicle body, and an engine for driving the rear wheel and the mowing cutter mechanism. The driver's seat is disposed substantially at the longitudinally central part of the vehicle body, the engine is disposed below the driver seat, a fuel supply system of the engine is disposed at one side of the engine, and an exhaust system of the engine is disposed at the other side of the engine. Power of the engine is transmitted through a pulley belt to an input shaft of a transmission gearing for the rear wheels, with the transmission gearing being disposed behind a rear axle, and concurrently from the input shaft through another pulley belt to the cutter mechanism which is level-adjustably disposed substantially in the longitudinal central part of the vehicle body. The cutter mechanism housing has a maximum transverse width of dimension less than the distance within the respective transversely outside faces of the rear wheels. The cutter housing is disposed substantially in the longitudinally central part of the vehicle body, while the engine is disposed within a contour of the cutter housing as viewed from above.

12 Claims, 2 Drawing Figures

RIDING TYPE MOWER

BACKGROUND OF THE INVENTION

1. Field of the Invention

The present invention relates generally to a lawn mower. More particularly, the invention relates to a riding type mower adapted to be operated by an operator riding thereon to perform grass mowing work.

2. Description of Relevant Art

There have been put to practical use a number of riding type mowers, which included a grass cutter disposed under a vehicle body and driven with an engine to mow lawn grass, and was adapted to be operated by an operator riding thereon to perform grass mowing work, while mowing with driven wheels.

Such riding type mower has accompanied desiderata in relation to the preference for a mower simplified in the constitution, substantiating a compact design of the configuration, while achieving excellent weight balance thereof, which preference is inclined to be all the more intensified in achieving the compact design, as the longitudinal length of the mower becomes shorter and the operating position of the driver riding thereon is kept lower and besides the transverse width of the mower is reduced. Moreover, in the attempt to meet such preference, more rational and functional arrangement is desired of various components such as a carburetor and a fuel tank of a fuel supply system, whereas it is unfavorable for the fuel supply system to be disposed so as to experience thermal influences from an exhaust system of hot temperatures.

In this respect, as an example of conventional riding type mower of the class described, there is one disclosed in U.S. Pat. No. 3,169,358.

In the riding type mower according to this U.S. patent, from an engine disposed in the vicinity of the rear part of a vehicle body, engine power was transmitted through a transmission route to a grass cutter level-adjustably attached to the underside of the vehicle body, substantially in the central part thereof, as well as through another transmission route to rear wheels. More particularly, the cutter was accommodated in a cutter housing level-adjustably attached to the underside of the vehicle body, substantially in the central part thereof.

In this riding type mower, the transmission routes from the engine to the grass cutter and to the rear wheels, respectively, were relatively short and simplified to some extent, when compared with corresponding transmission routes in a conventional riding type mower which had an engine disposed in the front part of a vehicle body, like ordinary passenger cars. In the front-engine type riding mower, the transmission route from the engine to a grass cutter disposed substantially under the longitudinal central part of the vehicle body was inherently long and complicated, as well as that from the engine to rear wheels.

Moreover, in the front-engine type riding mower, the engine had an installation space thereof separated to be occupied at a longitudinal distance from a mounting space of a driver's seat, so that the total vehicle length was resricted, when trying to contract, due to the separation of such spaces in the longitudinal direction of the vehicle body. To the contrary, in the riding type mower according to the U.S. patent, the engine was enveloped with a cover member having a driver's seat mounted thereon, thus eliminating the need of providing an exclusive longitudinal space for installation of the engine, thereby achieving the contraction of the vehicle length to some extent.

However, in the riding type mower according to the U.S. patent, the transmission route from the engine to the grass cutter, as well as that therefrom to the rear wheels, was complicated in the structure. Particularly, between the engine and the level-adjustable cutter disposed close to each other, the power transmission route was complicated by the provision of too many component parts for the necessary adaptation to absorb vertical displacement of the cutter.

Further, in this riding type mower, the cutter housing was considerably projected beyond transversely outside faces of the rear wheels and those of front wheels, thus constituting the inconveniency in the packing and carrying work.

In this respect, in certain working places, most of the ground to work for mowing or move about while riding on a mower may include large undulations and/or slopes, thus being small of flat surface, and in certain cases, it may be needed for a mower not only to advance but also to retreat. Such being the case, for mowers it is generally unfavorable to have various equipments or component parts outwardly projecting beyond the region of vehicle body.

Still more, in the mower according to the aforesaid U.S. patent, although the vehicle length was effectively shortened to some extent, the engine as well as the driver's seat was disposed still at the rear of the cutter housing, thus failing to sufficiently effect such contraction of vehicle length, with a desideratum left unfulfilled.

The present invention has been achieved to effectively solve such problems and overcome objects of conventional riding type mowers including the mower according to the aforesaid U.S. patent.

SUMMARY OF THE INVENTION

According to the present invention, there is provided, in a riding type mower (1) including a vehicle body (2, 3), a front wheel (4) steerably arranged in the front part of the vehicle body, a rear wheel (5) drivably arranged in the rear part of the vehicle body, a mowing cutter means (16, 17) disposed under the vehicle body, a driver's seat (30) disposed on the vehicle body, an engine (7) operatively interconnected with, to drive, the rear wheel and the mowing cutter means, a fuel supply system consisting of a fuel feed equipment (22) and a fuel tank (23), and an exhaust system consisting of an exhaust pipe (241) and a muffler (25), an improvement comprising the driver's seat (30) disposed substantially at the longitudinally central part of the vehicle body (2, 3), the engine (7) disposed below the driver's seat (30), the fuel supply system disposed at one side of the engine (7), and the exhaust system disposed at the other side of the engine (7).

Moreover, in a preferred embodiment of the present invention, the riding type mower further comprises an engine output shaft (701) downwardly extending from the engine (7), the engine output shaft (701) having a drive pulley (12) fixed thereon, a transmission gearing (8,9) for the rear wheel (5), the transmission gearing (8, 9) being disposed behind an axle (501) of the rear wheel (5), the transmission gearing (8, 9) having a downwardly extending input shaft (11) provided with an upper pulley (10) and a lower pulley (15) both fixed thereon, the upper pulley (10) and the lower pulley (15) being both disposed behind the axle (501) of the rear wheel (5), a cutter drive pulley (18) for driving the mowing cutter means (16, 17), the mowing cutter means (16, 17) being disposed substantially at the central part of the vehicle body (2, 3), a drive belt (13) for interconnecting the drive pulley (12) on the engine output shaft (701) with the upper pulley (10) on the input shaft (11) of the transmission gearing (8, 9), and a drive belt (19) for interconnecting the lower pulley (15) on the input shaft (11) of the transmission gearing (8, 9) with the cutter drive pulley (18), and the mowing cutter means (16, 17) is adapted to be level-adjustable Further, preferably, the riding type mower includes two rear wheels (5, 5) disposed one at the left side of the vehicle body and the other at the right side thereof, the mowing cutter means (16, 17) comprises a grass cutter (17) and a cutter housing (16) for enclosing the grass cutter (17), and the cutter housing (16) has the maximum transverse width thereof dimensioned to be within the distance between respective transversely outside faces (502, 503) of the rear wheels (5, 5) at the left and right sides of the vehicle body (2, 3).

Furthermore, preferably, in the riding type mower, the mowing cutter means (16, 17) comprises a grass cutter (17), a cutter housing (16) enclosing the grass cutter (17), and the grass cutter (17) and the cutter housing (16) both being disposed substantially in the longitudinally central part of the vehicle body (2, 3), and the engine (7) is disposed within a contour (A) of the cutter housing (16) as viewed from above.

Accordingly, an object of the present invention is to provide a riding type mower, in which the weight balance is favorably kept and the vehicle width is sufficiently contracted, while concurrently a fuel supply system is effectively protected against thermal influences from an exhaust system of an engine.

Another object of the present invention is to provide a riding type mower, in which a transmission route from a engine to a grass cutter as well as to a driven rear wheel is possibly simplified of the structure.

Still another object of the present invention is to provide a riding type mower, which is facilitated of the packing and carrying, and permitted to be effectively prevented from interference with obstacles while moving for grass mowing work.

Yet another object of the present invention is to provide a riding type mower, in which the vehicle length is contracted as much as reasonably possible.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
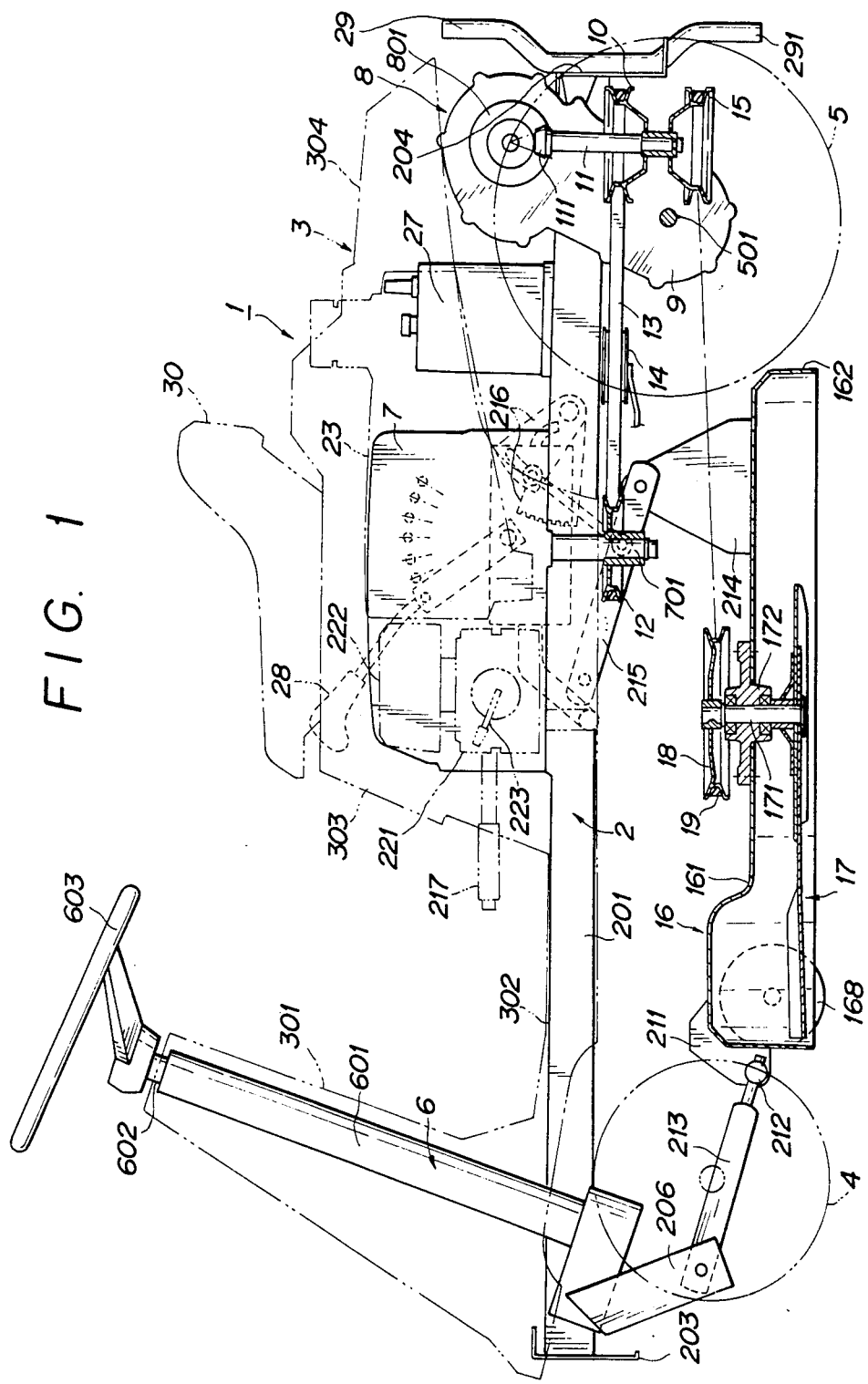
FIG. 1 is a side view, partly in section, of a riding type mower according to a preferred embodiment of the present invention.
Figure 2:
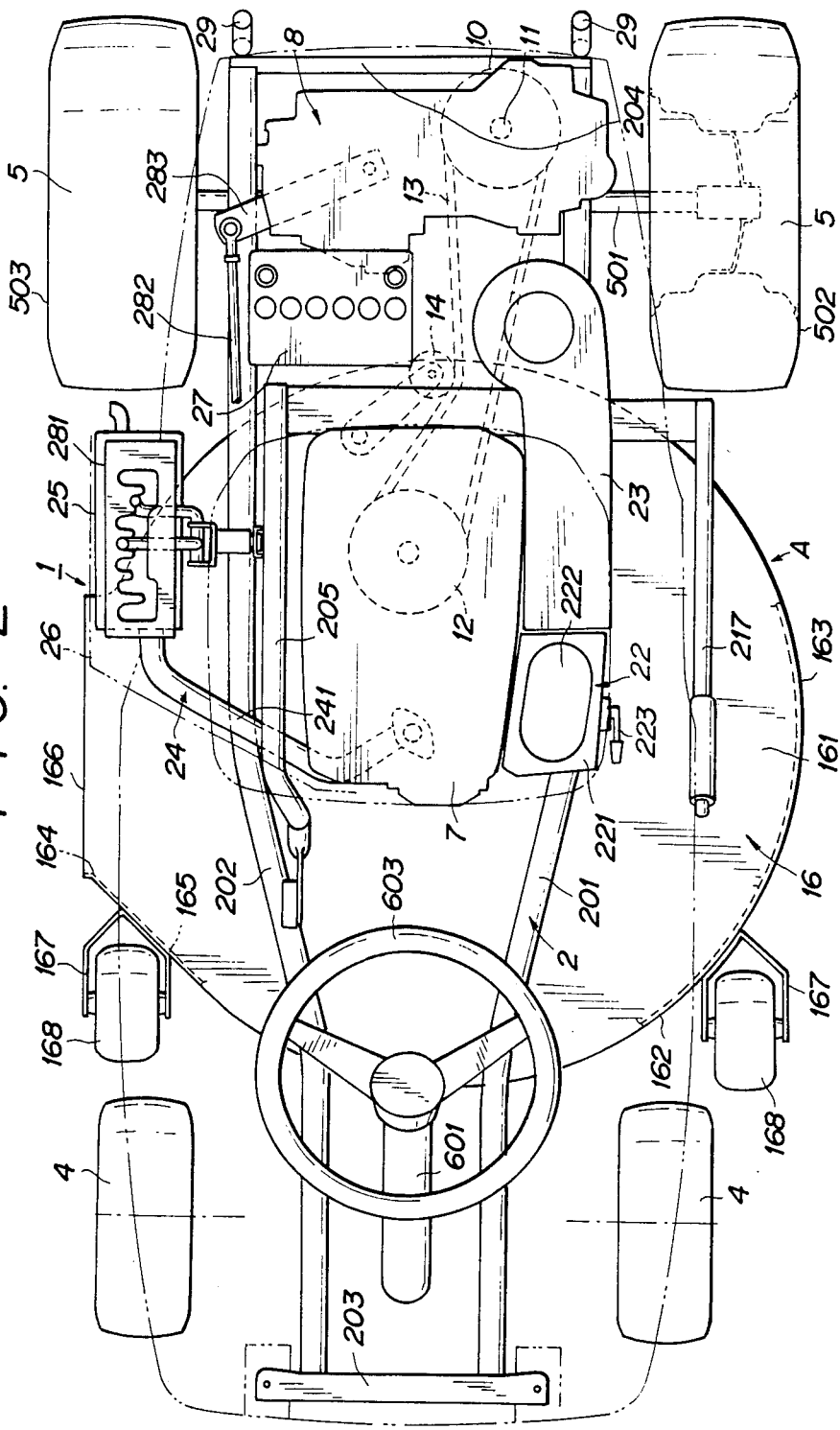
FIG. 2 is a plan view of the mower of FIG. 1.

Referring now to the accompanying drawings, FIGS. 1 and 2, designated at reference numeral 1 is a riding type mower according to the preferred embodiment of the present invention. The body of the riding type mower 1 is constituted with a chassis frame 2, which includes at the left and right sides thereof a pair of longitudinally extending main frame members 201, 202, at the front and rear ends thereof a pair of transversely extending cross members 203, 204, and at an intermediate position between these another cross member which is omitted from the drawings for the conveniency of comprehensive representation of essential parts. The chassis frame 2 is enveloped at both sides as well as from above with a body cover 3 placed thereon, which cover 3 consists of a front cover portion 301 upwardly extending in the front thereof, an intermediate cover portion 303 of a hillcrest-like configuration in the longitudinally intermediate part thereof, the intermediate cover portion 303 being provided as a seat support portion concurrently serving as an engine cover, a floor portion 302 stretched between the rear lower edge of the front cover portion 301 and the front lower edge of the intermediate cover portion 303, and a rear cover portion 304 rearwardly extending from the intermediate cover portion 303. At the respective transversely inner sides of the left and right main frame members 201, 202 are provided a pair of seat post members 205 rearwardly rising therefrom, while the seat post member at the left side is omitted from the drawings.

The chassis frame 2 is provided at both sides of the front part thereof a pair of steered front wheels 4, 4 of a relatively small diameter, and at both sides of the rear part thereof a pair of driven rear wheels 5, 5, the front wheels 4, 4 of a relatively large diameter. The front wheels 4, 4 are steerable to the left and right with a steering mechanism 6, which includes a steering wheel 603 operable to thereby rotate a steering shaft 602 inserted in a steering column 601 vertically provided through the front cover portion 301.

The chassis frame 2 has mounted thereon an engine 7 disposed at a transversely intermediate position of the longitudinally central part thereof, the engine 7 being enclosed from around as well as from above with the intermediate cover portion 303 which is provided with a single driver's seat 30 mounted thereon. In this embodiment, the engine 7 is of a vertical type including a vertically arranged crankshaft (not shown) with a downwardly projected output shaft 701. As a result, the front part of the frame 2 has mounted thereon no more than the steering mechanism 6, thus being permitted to be relatively short in the longitudinal direction thereof, effectively contributing to shortening the total length of the mower 1.

Between the rear wheels 5, 5 there is provided a transmission casing 8 accommodating therein a transmission gearing including a reduction gearing (not shown), the casing 8 being disposed behind, at a higher level than, a rear axle 501 transversely extending through a reduction casing 9 which is constituted with the lower part of the transmission casing 8. The transmission casing 8 is inwardly stepped at the left side thereof to provide thereunder, behind the rear axle 501, an input shaft 11 downwardly extending perpendicularly to the rear axle 501. The input shaft 11 has in the middle part thereof an upper pulley 10 fixed thereon, and further at the upper end thereof a drive bevel gear 111, which gear 111 is drivingly engaged with a driven bevel gear 801 disposed in the upper part of the transmission casing 8, so that input power from the engine 7 to the shaft 11 is transmitted to the gearing in the casing 8 and output through a gear in the casing 9 to drive the rear axle 501. The transmission casing 8 has a geometry dimensioned in the side view to be substantially coincident at the rear edge thereof with the respective rear ends of the main frame members 201, 202, whereby achieved is a favorable constitution of the rear part of the mower 1 having no component parts thereof projected behind the rear ends of the members 201, 202, excluding the rear edges of the rear wheels 5, 5, subject to a pair of later described stays 29, 29.

The downwardly projected output shaft 701 of the engine 7 is provided with a drive pulley 12 fixed thereon, the pulley 12 being disposed at the same level as the upper pulley 10 on the input shaft 11 of the transmission casing 8, with a drive belt 13 stretched therebetween, which belt 13 is tensioned with a roller 14 pushed against a longitudinally intermediate position thereof, so that output power of the engine 7 is effectively input into the transmission casing 8, thereby driving the rear wheels 5, 5 as well as a later described grass cutter 17.

The transmission input shaft 11 has fixed thereon, at the lower end thereof, a lower pulley 15 adapted to drive the cutter 17 which is accommodated in a level-adjustable cutter deck or housing 16 disposed under the longitudinally intermediate part of the vehicle body. As will be seen from FIG. 2, the cutter housing 16 is shaped substantially in the form of a circular plate inverted up side down, relatively large in the diameter, and consists of an upper base portion 161 and a circumferential portion 162 with an outside diameter substantially the same as the distance between respective transversely outside faces 502, 503 of the left and right rear wheels 5, 5, so that the housing 16 is kept, exemplarily, at a left peripheral portion 163 thereof from outwardly projecting, exceeding a position thereof corresponding to the outside face 502 of the left rear wheel 5, in the transverse direction of the vehicle body. At the opposite side, that is, at the right side in this case, the cutter housing 16 has formed therein a discharge duct 164 for discharging therefrom lawn grass mowed, the duct 164 being transversely outwardly (rightwardly) opened and located substantially at the longitudinally central part of the vehicle body. In the housing 16 according to this embodiment in which the cutter 17 as viewed from above is adapted to rotate clockwise, the discharge duct 164 has a front wall 165 thereof rearwardly slanting, as it rightwardly approaches the duct end, to effectively discharge mowed grass in a rearwardly inclined outward direction of the mower 1. The outward opening of the duct 164 is defined by a longitudinally straight edge 166 arranged transversely inside relative to the outside face 503 of the right rear wheel 5. Incidentally, the circumferential portion 162 of the cutter housing 16 is provided, at the left and right sides of the front part thereof, with a pair of brackets 167, 167 fixed thereto to thereby support a pair of guide rollers 168, 168 of a small diameter, the rollers 168, 168 being adapted for the guiding of the entire housing 16.

The grass cutter 17 is disposed inside the cutter housing 16, and driven with a drive shaft 171 which is upwardly projected, through a shaft bearing holder 172 provided through the central part of the housing 16, to have fixed at the upper end thereof a cutter-drive pulley 18 driven from the lower pulley 15 on the transmission input shaft 11, with a drive belt 19 stretched therebetween.

Accordingly, the cutter 17 is adapted to be driven to rotate from the engine 7 through the pulleys 15, 18, thus permitting grass mowing work to be performed, while driving to advance the entire mower 1 with the rear wheels 5, 5. Moreover, to the cutter-driving pulley 18, such torque is directly transmitted from the drive pulley 15, that the input shaft 11 has as it is given from the drive pulley 12 at the engine 7 through the belt 13 and the pulley 10. Further, there is provided a relatively long span between the pulley 18, which is disposed in front of the engine output shaft 701 and located at the center of the cutter housing 16 substantially centered to the vehicle body, and the drive pulley 15 therefor, which is fixed on the the lower part of the transmissioHbvH input shaft 11 disposed behind the rear axle 501. As a result, when adjusting the level of the cutter housing 16 together with the cutter 17 to thereby adjust the mowing height of lawn, although the pulley 18 also is changed in the level relative to the pulley 15 fixed at a stationary level, the aforesaid long span effectively permits the drive belt 19 therebetween to be kept possibly small in the variation of angular position thereof with respect to the horizontal, thus being prevented from running out of either of the pulleys 15, 18 or from failing to keep assure the transmission of power or against one-sided abrasion thereof. Therefore, power transmission is effectively assured between the pulleys 15, 18, even when the pulley 18 has the level thereof altered for adjustment.

The level adjustment of the cutter housing 16 is effected by means of a front bracket 211 fixed to the front end of the housing 16, which bracket 211 is articularly interconnected at the front end thereof through a joint 212 and a link 213 with the lower end of a downwardly extending bracket 205 secured to the front end of the chassis frame 2, and a rear bracket 214 fixed upright on the rear part of the housing 16, which bracket 214 is operatively connected at the upper end thereof through a link 215 to a guide stopper mechanism 216 and a hand lever 217 provided at the left side of mower 1, the lever 217 being adapted to be operated to vertically move the housing 16, when necessary.

At left side of the engine 7, at a lower level than the driver's seat 30, is provided a fuel feed equipment 22, which consists of a fuel feeding unit 221 including a carburetor (not shown) and an air cleaner 222 disposed thereon, and which has arranged on the outside thereof a throttle lever 223 adapted to be thumbed to move clockwise or counterclockwise in FIG. 1 to thereby effect throttling. Still at the left side of the engine 7, behind the fuel feed equipment 22 is disposed, continuously therewith, a fuel tank 23 as a fuel reservoir extending, at the near side of the engine 7, along the engine 7, from the longitudinally intermediate part to the rear end thereof, and further rearwardly projecting therefrom. Thus, in this embodiment which has arranged at one side of the engine 7 a fuel supply system composed of the fuel feed equipment 22 and the fuel tank 23, the engine 7 has at this side an effectively utilized space which contributes also to designing the width of the mower 1 to be smaller as practicable, and besides, due to the continuous longitudinal arrangement, the fuel supply system is permitted to come off with a fuel feed piping extremely short, thus enabling achievement of smoothed fuel supply as well as great facilitation of piping installation. In addition thereto, in this embodiment, the fuel feed equipment 22, disposed at the opposite side of the cutter housing 16 relative to the grass discharge duct 164, is favorably protected against dust attendant the discharge of lawn grass mowed by the cutter 17.

On the other hand, at the right side of the engine 7, there is provided an exhaust equipment 24 including an exhaust pipe 241 which extends, at the near side of the engine 7, from the front lower part of the engine 7, first therealong and then in a rearwardly inclined rightward direction, to a position corresponding to the longitudinally intermediate part of the engine 7, where it is connected at the rear end thereof to a muffler 25 which extends, at the same side of the engine 7, with a clearance left therebetween, along the engine 7, from the longitudinally intermediate part toward the rear end thereof. Covering the exhaust pipe 241 as well as the muffler 25, there is provided a duct 26, into which cooling air is delivered from a fan (not shown) attached to the engine 7, thereby cooling the exhaust pipe 241 and the muffler 25, while shielding various objects in the ambient space from such exhaust system, so that a thermal shielding is ensured notwithstanding the disposition of the exhaust system, which is lying under the driver's seat 30, that is, under the hips of a driver as well as behind his legs. Moreover, in this embodiment in which the exhaust system is disposed at one (right) side of the engine 7 and thereby separated from the fuel supply system disposed on the other (left) side thereof, the fuel supply system is favorably protected against thermal influences from the exhaust system. The one-sided disposition of the exhaust system with respect to the engine 7 is further advantageous in the utilization of vehicle space. Furthermore, the separating disposition between both sides of the engine 7 effectively contributes to the minimization of the vehicle width. Still more, the rearwardly inclined arrangement of the transversely extending exhaust pipe 241 allows an effective pipe length to be secured, without the fear of interference with the transmission gearing including the reduction gearing disposed in the rear part of the vehicle body or with other equipments arranged behind the engine 7 such as a below described battery 27 as an electric power source mounted on the vehicle. According to the embodiment, there is thus achieved effective use of space at the rear of the engine 7, permitting the longitudinal vehicle length as well as the vehicle width to be minimized, contributing to the design of compact-sized riding type mower.

Incidentally, the battery 27 is disposed behind the engine 7 and in front of the transmission casing 8, to thereby effectively utilize an interspace therebetween, as well.

For the conveniency of operation, the hand lever 217 adapted for the level adjustment of the cutter 17 is disposed at the left side of the mower 1, as well as the throttle lever 233. In this respect, at the opposite side is disposed a speed-change lever 29 cooperating with a shift pattern plate 281 disposed outside the engine 7, that is, at the right thereof, behind the speed-change lever 28, and more particularly, above the muffler 25 in this embodiment; the cooperation of the lever 29 with the plate 281 establishes a shiftable operating position of a longitudinally extending rod 282, thereby controlling the angular position of a shift lever 283 rotatable about a vertical axis, the lever 283 being assembled into the transmission casing, to thereby shift the mode of moving speed of the mower 1. With such arrangement, a variable speed gear of the mower 1 is constituted.

Behind the rear ends of the main frame members 201, 202 of the chassis frame 2, there are provided the aforementioned stays 29, 29, which normally have a vertical position as shown in FIG. 1, and adapted to be used in a horizontal position thereof, when the mower 1 is let to stand thereon with the rear part of the vehicle body down, to facilitate stable accommodation of the standing mower 1 into a mower carrying case (not shown). Moreover, the stays 29 in the vertical position, in which the lower ends thereof are at a higher level than grounded areas of the rear wheels 5, can serve to check the vehicle body, as it is working on a sloped ground, from being caused to incline in excess of a predetermined angular position thereof relative to the horizontal. Further, the stays 29 are adapted to function as rear bumpers, as well.

Incidentally, the cutter housing 16 is disposed below the longitudinally middle part of the chassis frame 2. On the other hand, the engine 7 as well as the driver's seat 30 is arranged on the frame 2, substantially at the longitudinally and transversely central part thereof, so as to be disposed within the contour of the cutter housing 16 as viewed from above, which contour is referenced by character A in FIG. 2. In this respect, when compared with a front engine type vehicle, this embodiment favorably permits the transmission gearing in the casing 9 as well as the reduction gearing in the casing 8 for driving the rear wheels 5 to be disposed possibly near the engine 7. Moreover, due to the unique disposition of the cutter housing 16, also the rear wheels 5 are allowed to be disposed possibly near the housing 16. Further, with no engine disposed at the front of the mower, the front part of the vehicle body is favorably allowed to have a minimized longitudinal length, thus contributing to minimization of the total longitudinal length of the vehicle, as well as facilitation in the achievement of compact vehicle design. Besides, the transmission casing 8, which is disposed relatively near the engine 7, permits a simple and inexpensive transmission mechanism such as a belt drive mechanism as illustrated by the members 12, 13, 14, 10, 11, 15, 19, and 18 in the drawings.

As will be understood from the foregoing description, according to the present invention, the fuel supply system consisting of the fuel feed equipment 22, the fuel tank 23, etc. and the exhaust system consisting of the exhaust pipe 241, the muffler 25, etc. are spaced apart from each other to be disposed either at the left and and the other at the right of the engine 7 arranged below the driver's seat 30 substantially in the longitudinaHbvHly central part of the vehicle body, so that the fuel supply system is effectively shielded against thermal influences from the exhaust system, thus being permitted to exhibit inherent performance thereof, ensuring smooth fuel supply.

Moreover, in the foregoing arrangment, the engine 7 has transverse spaces at both sides thereof effectively utilized to dispose therein the fuel supply system and the exhaust system in a distributed manner, thereby substantiating an ideal disposition thereof, so that dead spaces at both sides of the engine 7 are utilized to accommodate therein the fuel supply and exhaust systems in a compact manner, thereby possibly minimizing the vehicle width, conferring facilitations to achive a compact contour design of mower.

Further, the fuel feed equipment 22 and the fuel tank 23 are both disposed at one transverse side of the engine 7 and thus permitted to be arranged in a longitudinally continued manner, thereby minimizing the degree of projection of the fuel supply system in both the longitudinal and transverse directions of the vehicle body, contributing in this point also to checking increase in the vehicle width, in addition to that the longitudinal vicinity between those members permits fuel piping to come off with a short length, thus achieving simplification of the fuel supply system.

Furthermore, the engine 7 is disposed under the driver's seat 30 substantially in the longitudinally central part of the vehicle body, thus effectively lowering the center of gravity of the vehicle; while centering the weighty component to the vehicle body, thereby permitting, in cooperation with the disposition of the fuel tank 23 put in the vicinity thereof, the achievement of a riding type mower low of the center of gravity, thus being good at balancing and advantageous in the operability, in addition to the possibility of further improving the balance by locating the battery 27 as another weighty component at the rear of the engine 7.

Still more, a transmission system from the engine 7 to the grass cutter 17 and another transmission system to the driving gearing for the rear wheels 5 are both substantiated by means of a simple transmission route composed of a belt and pulley drive mechanism, and have commonly employed a single primary shaft, that is, the input shaft 11 serving as an input shaft for the transmission gearing in the casing 8 and concurrently as an output shaft for the cutter 17, the input shaft 11 being provided with the upper and lower pulleys 10, 15 adapted for such two simultaneous modes of service, so that there is achieved an extremely simplified transmission system in which a single transmission route from the engine 7 to the pulley belt 13 is responsible for distributing engine power to a pair of transmission routes, whereby a wheel-driving and cutter-driving system as an essential part of the mower 1 is greatly simplified, resulting in appreciable cost reduction as well as great advancement in the practicability and utility of the riding type mower.

Still more, the input pulley 10 for the transmission gearing and the output pulley 15 for the grass cutter 17 are both disposed behind the the rear axle 501 of the rear wheels 5, so that, although the output pulley 15 for the cutter 17 and the input pulley 18 for same are disposed possibly near the engine output pulley 12 to minimize the longitudinal length of the mower 1, the span between the output and input pulleys 15, 18 for the cutter 17 is permitted to be set relatively long and thus, even when the level of the cutter 17 is altered to be adjusted, the belt 19 stretched between the pulleys 15, 18 is kept small of the angular displacement, thereby assuring smooth transmission of power from the engine 7 to the cutter 17 through the belt 19 and the pulleys 15, 18, in addition to that the small angular displacement of the belt 19 tends to eliminate one-sided abrasion thereof, raising the endurability, thus resulting in the possibility of achieving a useful power transmission system simple in the constitution and excellently adapted for the mowing of lawn grass.

In addition, the cutter housing 16 accommodating therein the grass cutter 17 has the maximum transverse dimension thereof limitted within the respective transversely outside faces 502, 503 of the left and right rear wheels 5, 5, that is, designed to be kept from transversely outwardly projecting beyond the respective outside faces 502, 503 of the rear wheels 5, 5. Thus, the riding type mower 1 is favorably facilitated for the pacing and carrying, and effectively prevented against interference with obstacles, when driven to move while working. Moreover, the tension roller 14, the drive belt 13, and the drive pulleys 10, 15 as elements of a primary transmission route, as well as the transmission casing 9 including the reduction casing 8 and the battery 27, are all disposed at the rear of the driver's seat 30, in an interspace between the rear wheels 5, 5, which space is thus effectively utilized for rational arrangment of equipments therein. Particularly, the transmission casing 9 including the reduction casing 8 and the like are installed together among the engine 7 and the rear wheels 5, 5, without extensions outwardly projecting from the rear end of the vehicle body, so that, in retreating movements such as on a sloped ground, the mower 1 is favorably facilitated to be driven without the need of concentrating extreme attentions to circumstances therebehind, there being thus provided a riding type mower excellent in the maneuverability.

In addition to the foregoing, with the stays 29 provided at the rear end of the vehicle body and adapted to serve also as rear bumpers, the mower 1 is permitted to be let to stand with the rear part thereof down, to be stored in a relatively narrow space. The stays 29 can serve as an inclination limitter of the mower 1, as well.

Besides above, in the mower 1, the engine 7 is disposed within, substantially at the center of, the contour line A of the cutter housing 16, as it is viewed from above, which housing 16 is placed substantially below the longitudinally central part of the vehicle body, so that the engine 7 is completely overlapped on the housing 16 in the longitudinal direction of the vehicle body, thus further contributing to shortening the total length of the mower 1, when compared with the mower according to the aforesaid U.S. patent. Further more, in the comparison with the case of a conventional mower in which an engine is installed in the front part of a vehicle body, in the mower 1 according to the present invention the distance between the engine 7 and the transmission casing 9 is favorably shortened, thus achieving effective minimization as well as simplification of a transmission route therebetween.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicated by the appended claims rather than by the foregoing description.

We claim:
1. A riding type mover comprising:
a vehicle body;
a front wheel steerably arranged in the front part of the vehicle body;
a rear wheel drivably arranged in the rear part of the vehicle body;
a mower cutting means including a housing disposed under vehicle body;
a driver seat disposed on said vehicle body;
an engine operatively interconnected with, to drive, said rear wheel and said mower cutting means;
an engine output shaft downwardly extending from said engine, said engine output shaft having a drive pulley fixed thereon;
a transmission gearing for said rear wheel, said transmission gearing being disposed behind an axle of said rear wheel, said transmission gearing having a downwardly extending input shaft provided with an upper pulley and a lower pulley being fixed thereon, said upper pulley and said lower pulley being both disposed behind said axle of said rear wheel;

a cutter drive pulley for driving said mower cutting means, said mower cutting means being disposed substantially at the center part of said vehicle body;

a drive belt for interconnecting said drive pulley on said engine output shaft with said upper pulley on said input shaft of said transmission gearing;

a drive belt for interconnecting said lower pulley on said input shaft and said transmission gearing on said cutter drive pulley, wherein said mower cutting means is to be level-adjustable;

a fuel supply system consisting of a fuel feed equipment and a fuel tank; and an exhaust system consisting of an exhaust pipe and a muffler, wherein said driver seat is disposed substantially at the longitudinal central part of said vehicle body, said engine being disposed directly below said driver seat, said fuel supply system being disposed at one side of said engine, said exhaust system being disposed at the other side of said engine and said cutter means and housing, said engine and said driver seat being disposed substantially ath the longitudinal central part of the vehicle body, and within the contour of the cutter housing as viewed from above.

2. A riding type mower according to claim 1, including two said rear wheels disposed one at the left side of said vehicle body and the other at the right side thereof, wherein:

said mowing cutter means comprises a grass cutter and a cutter housing for enclosing said grass cutter; and said cutter housing has the maximum transverse width thereof dimensioned to be within the distance between respective transversely outside faces of said rear wheels at the left and right sides of said vehicle body.

3. A riding type mower according to claim 1, wherein:

said fuel feed equipment and said fuel tank are continuously arranged in the longitudinal direction of said vehicle body.

4. A riding type mower according to claim 1, wherein:

said exhaust pipe is extended, at said one side of said engine, in a rearwardly inclined outward direction of said engine.

5. A riding type mower according to claim 1, wherein:

said mowing cutter means comprises a grass cutter, a cutter housing enclosing said grass cutter, and aid cutter housing having, at said other side of said engine where said exhaust system of said engine is disposed, a discharge duct for discharging therefrom lawn grass mowed with said grass cutter.

6. A riding tyep mower according to claim 1, further comprising:

a stay disposed at the rear end of said vehicle body; and said stay to let said mover to stand thereon with the rear part thereof down, as well as to serve as a rear bumper.

7. A riding type mover according to claim 6, wherein:

said stay has a lower end part thereof at a higher level than a grounded area of said rear wheel.

8. A riding type mower according to claim 1, wherein:

said upper pulley on said input shaft of said transmission gearing is disposed at the same level as said drive pulley on said engine output shaft.

9. A riding type mover according to claim 2, further comprising:

a transmission gearing for said rear wheels; and said transmission gearing disposed behind said engine, between said rear wheels, and operatively interconnected with said engine.

10. A riding type mower according to claim 9, wherein:

said transmission gearing is substantially coincident at the rear end thereof with that of said vehicle body.

11. A riding type mower according to claim 9, further comprising:

a battery as an electric power source of said mower disposed in a longitudinal interspace between said enigne and said transmission gearing.

12. A riding type mower according to claim 1, wherein:

said driver's seat is a single-passenger seat.

* * * * *